United States Patent [19]

Sheen

[11] Patent Number: 4,940,206

[45] Date of Patent: Jul. 10, 1990

[54] FAUCET

[76] Inventor: Chung-Shan Sheen, 32, Ho Ping Rd., Hu Wei Town, Yun Lin Hsien, Taiwan

[21] Appl. No.: 310,867

[22] Filed: Feb. 15, 1989

[51] Int. Cl.$^5$ .................. F16K 21/16; F16K 31/00
[52] U.S. Cl. ..................... 251/52; 251/339; 137/603
[58] Field of Search ............ 251/339, 118, 50, 52; 137/603

[56] References Cited

U.S. PATENT DOCUMENTS

| 85,006 | 12/1868 | Harrison | 251/50 |
| 977,427 | 12/1910 | Armstrong | 251/118 X |
| 1,064,549 | 6/1913 | Schmeykal | 251/50 |
| 1,909,725 | 5/1933 | Schimmel | 251/50 X |
| 3,396,749 | 8/1968 | Troutman | 137/603 |
| 3,920,216 | 11/1975 | Barnum et al. | 251/52 X |

FOREIGN PATENT DOCUMENTS

| 460072 | 11/1913 | France | 251/50 |
| 410888 | 7/1945 | Italy | 251/50 |
| 556445 | 10/1943 | United Kingdom | 251/50 |
| 2198214 | 6/1988 | United Kingdom | 251/118 |

Primary Examiner—Stephen M. Hepperle
Attorney, Agent, or Firm—Asian Pacific Int'l Patent and Trademark Office

[57] ABSTRACT

A faucet of which the displacement of the valve cock is controlled through pressure equilibrium effect, which includes a draw-off tap assembly comprised of a casing, a valve cotter, a valve cock, a sealing plug, wherein said valve cock is mounted on said valve cotter, and said valve cotter is set in a cavity defined by said casing and said sealing plug with the rear end of said valve cotter been arranged to protrude beyond the water passage of said sealing plug. The draw-off tap assembly is fixed at the water outlet of the faucet to control water supply while a water temperature and flow rate regulating means is set at a front position of the faucet.

8 Claims, 4 Drawing Sheets

FAUCET

BACKGROUND OF THE INVENTION

Regular faucet includes a draw-off tap, having a spherical portion on its casing with a valve stem vertically set therein, which valve stem comprises a conical valve cock at the bottom and a nut at the upper portion to fix on the casing for further revolving control through a setting knob to let the valve stem make up-and-down displacement. Through the displacement of the valve stem to provide space difference in cross-section inside the tap, the flow rate is accordingly controlled.

In the above-said faucet, the setting knob is fixedly attached to the valve stem at the top for revolving control to define a passage for water flow. After use, the setting knob is turned counter-clockwise to block water flow. This kind of conventional faucet is not specifically suitable for hand washing, since it has several drawbacks as hereunder.

<1> Unreasonable structure and easy to break down: In regular faucets, a valve cock is the member to stop water flow. The displacement of a valve cock is controlled by a revolving knob. Because the force applied from the person's hand to turn a valve cock varies with people, insufficient force may be available to screw up the valve cock tightly and may lead to water leakage, while excessive force applied to a valve cock may damage the valve cock and may lead to severe water leakage. More particularly, the inner thread of the casing and the outer thread of the valve stem are likely to wear out quickly to become unworkable.

<2> The regulating cock and switch control mechanism are incorporated together to cause waste of water. In regular faucets, the operating point is spaced away from the water spout. One is not washing one's hands while turning on the setting knob of a faucet to let water continuously come out. Because the regulating cock and switch control mechanism are incorporated together, it is more difficult to accurately control flow rate. It is more than embarrassing to adjust water temperature and flow rate from water faucets during the winter season. The complicated procedure may not only take a little bit of time but also cause waste of water.

<3> When to turn on a faucet to release water, the person's dirty hands will contaminate the setting knob. After washing of hands, the clean hands will be contaminated when the contaminated setting knob is turned off.

In general, regular faucets are not practical for use in washing hands. For washing hands, it requires a specific draw-off tap.

SUMMARY OF THE INVENTION

The main object of the present invention is to provide a faucet in which the conical valve cock is controlled through equal pressure process, that is, by means of the water pressure with water current to control the displacement of valve cock so as to turn on the faucet or to stop water supply. In the present invention, the water regulating valve and water supply control valve are separately disposed on the faucet, such that proper water flow comes from the faucet when the valve stem is pushed upward after water flow rate and water temperature are properly adjusted. Because the operating point and the water outlet are arranged at the same position, one can wash the hands immediately upon simplified operation without causing any waste of water.

The drawings disclose an illustrative embodiment of the present invention which serves to exemplify the various advantages and objects hereof, and are as follows:

DETAILED DESCRIPTION OF THE PREFERRED EMBODIMENTS

Figure 1:
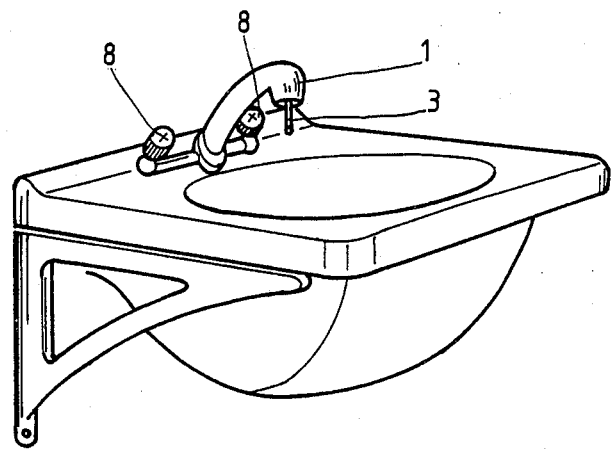
FIG. 1 is a perspective view, illustrating the outer appearance of the present invention, matching with a basin.

Referring to FIG. 1, cool water and hot water regulating valves 8 are separately disposed from a water outlet control element 3. As soon as water temperature and flow rate are properly adjusted through said regulating valves 8, the valve stem 3 of the draw-off tap is manually pushed upward to provide desired rate of water flow in desired temperature without further adjustment on said regulating valves 8.

Figure 2:
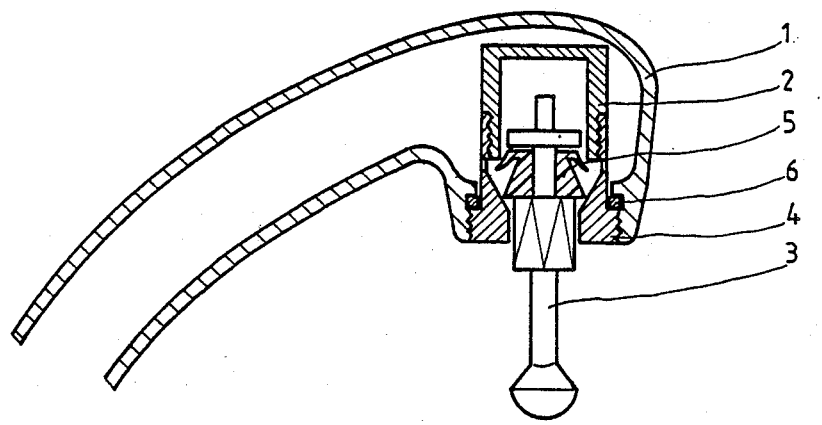
FIG. 2 is a sectional view of the assembly of the present invention.
Figure 3:
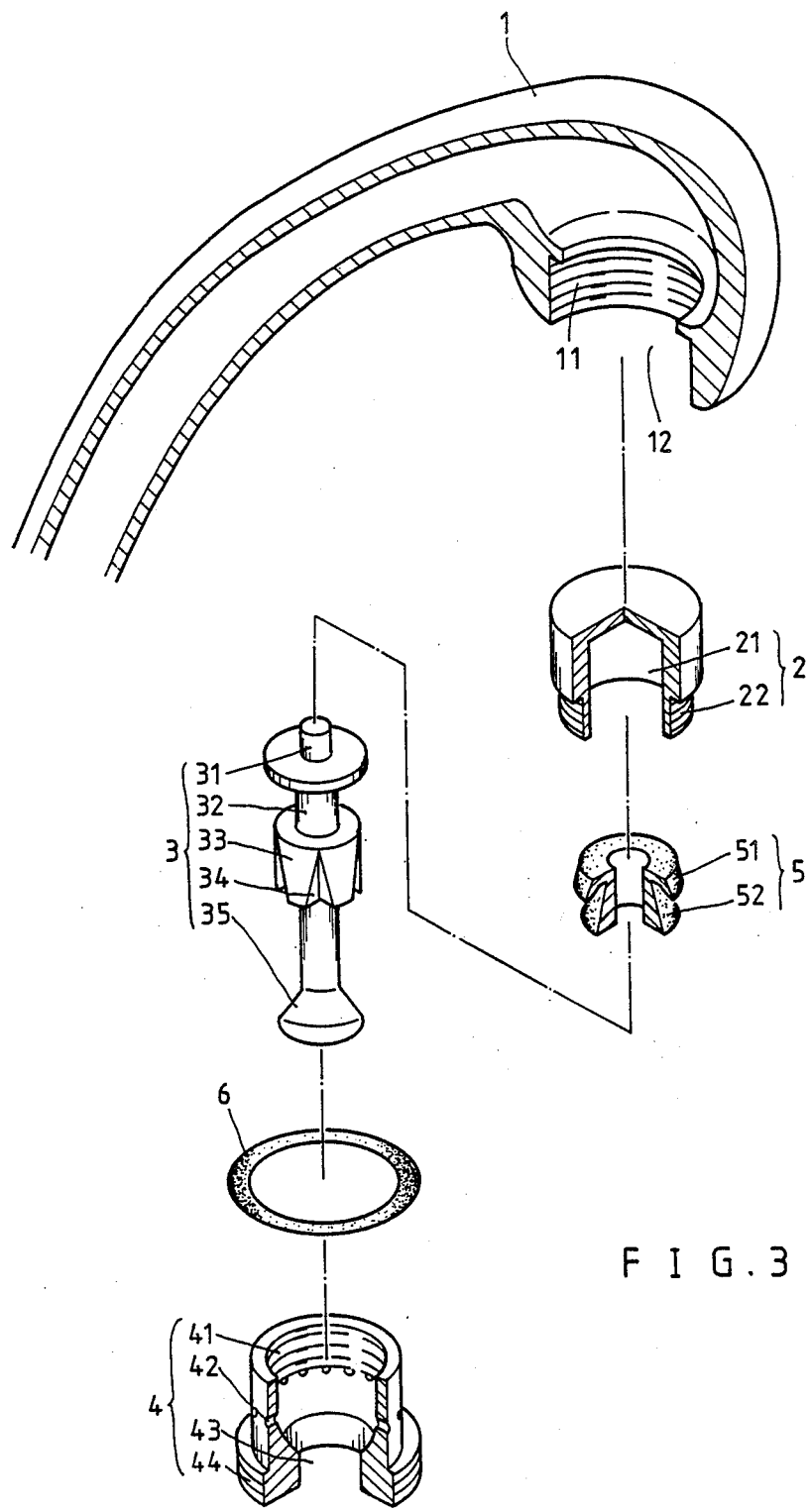
FIG. 3 is a perspective fragmentary view of the present invention.

Referring to FIGS. 2 through 3, a faucet includes a housing 1, a casing 2, a valve stem 3, a sealing plug 4, a conical valve cock 5, and a valve seal ring 6. Said casing 2 comprises an outer thread 22 to match with the inner thread 41 of said sealing plug 4 to define a cavity 21 for floatably setting therein said valve stem 3. Said valve stem 3 comprises a top protruding end 31 that extends above the water seat 43 of said sealing plug 4. Said sealing plug 4 comprises an outer thread 44 to match with the inner thread 11 of said housing 1 so as to let said casing 2, said valve stem 3 and said valve cock 5 be screwed up therebetween with said valve ring 6 being internally mounted on the water outlet end 12 of said housing 1 to form a switch, wherein said valve cock 5 is mounted on the circuit groove 32 of said valve stem 3. In the assembled condition of the components, sealing plug 4 and casing 2 form a multi-piece casing structure.

Figure 4A:
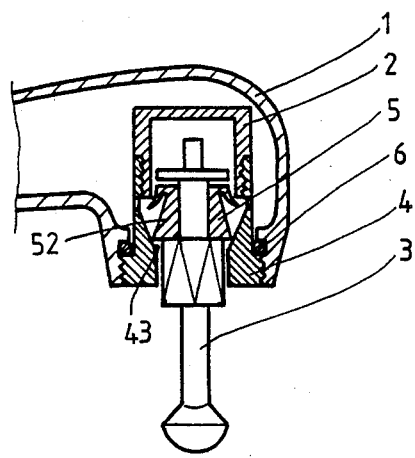
FIGS. 4-A, 4-B, and 4-C are schematic drawings, illustrating the operating procedures of the present invention.
Figure 4B:
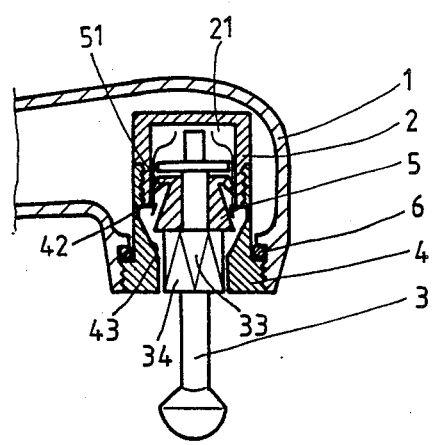
Figure 4C:
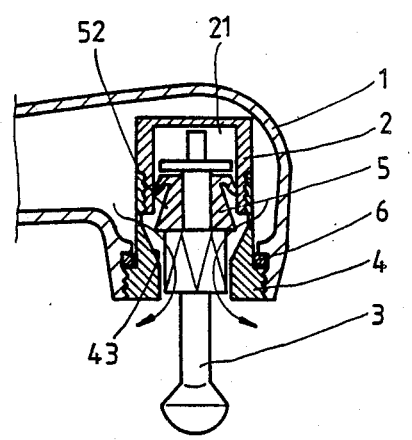

Referring to FIG. 4-A, said valve stem 3 is at a lower limit position with the bottom collar 52 of said valve cock 5 been pressed on said water valve seat 43 of said sealing plug, by means of the force of the gravity of water flow, to block up water supply.

Referring to FIG. 4-B, said valve stem 3 is pushed upward and the inner air in said cavity 21 of said casing 2 is squeezed to rapidly release from the gap around the upper collar 51 of said valve cock 5. After releasing the hand force on stem 3 the remaining air in said cavity 21 equalizes the inner pressure and the outer pressure, and said upper collar 51 of said valve cock 5 is disposed to seal said cavity 21 so as to let said valve stem 3 be kept at an upper limit position. Therefore, the water is flowing from said housing 1 through the water hole 42 and said water valve seat 43 of said sealing plug 4 and through the grooves 34 of the block 33 of said valve stem 3 to come out of the faucet for service. Because the total area of water holes 42 is smaller than the total cross-sectional area of grooves 34 the water pressure below said cavity 21 is quite low, the discharge water does not spray.

Referring to FIG. 4-C, after wash up of the person's hands, said valve stem 3 is then manually dragged downward, and the said upper collar 51 of said valve cock 5 will break away from said cavity 21 by means of the effect of water current, to let said bottom collar 52 seat against valve seat 43. Therefore, the faucet assumes a normal closed status. Because there is still some air in said cavity 21 and the air is variable, said valve stem 3 can be very easily dragged downward to let said bottom collar 52 be pressed down by water pressure to seat against valve seat 43. The stronger the water pessure, the better the sealing effect.

Figure 5:
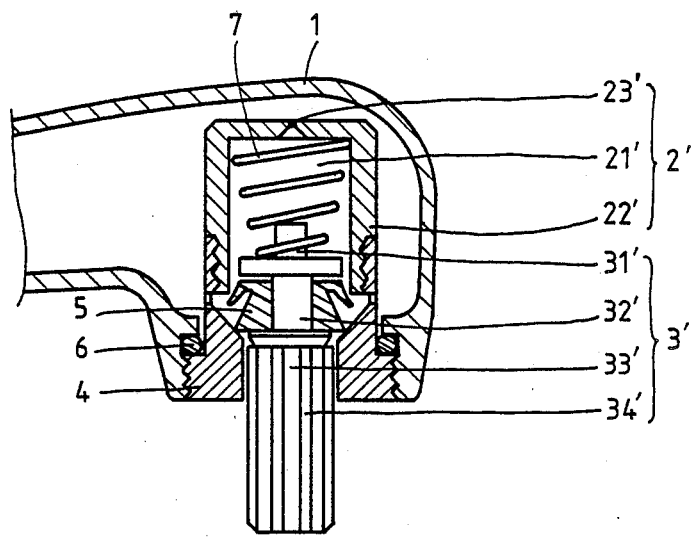
FIG. 5 is a sectional view of a "low speed automatic shut-off faucet assembly", another embodiment of the present invention.

Referring to FIG. 5, it illustrates a low speed automatic shut-off faucet assembly constructed according to the present invention, which has a similar structure as above-described in the first embodiment, wherein the casing 2' is arranged to provide a small hole 23' on the top, and a spring 7 is set in the cavity 21' with one end mounted on the top protruding end 31' of the valve cotter 3'. Through the tensile force of the spring 7 and the water pressure, the faucet assembly is to slowly and automatically shut off each time after been turned on.

Figure 6A:
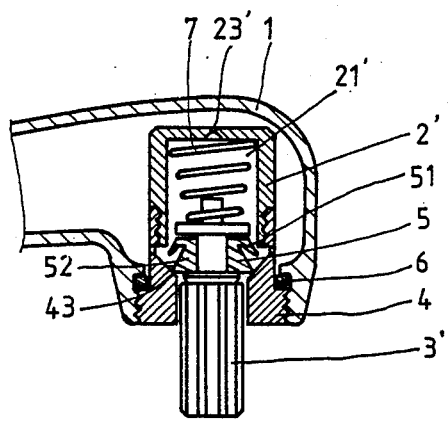
FIGS. 6-A and 6-B are schematic drawings, illustrating the operating procedures of the embodiment of FIG. 5.
Figure 6B:
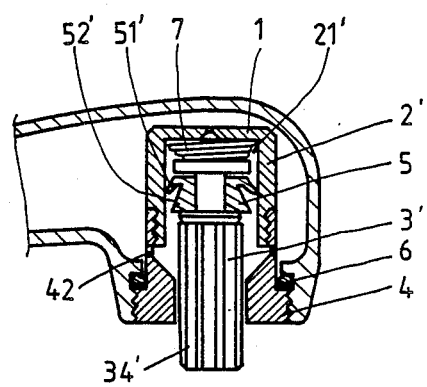

Please refer to FIGS. 6-A through 6-B, which illustrate the operating procedures of the second embodiment of the present invention. As shown in FIG. 6-A, it provides a non-step flow control. The range of time to discharge water depends upon the length of the valve cock set inside the cavity 21'. The bottom collar 52 is forced to block up the water passage 43 by the tensile force of the spring 7 and the water pressure of the water current, so as to stop water supply. When the valve cotter 3' is pushed to the upper limit, the air or water in the cavity 21' is squeezed out of the cavity 21' from the top hole 23' to flow thereover, so as to allow the valve cotter 3' be retained at the upper limit position and to let water current continuously discharge (as shown in FIG. 6-B).

Referring to FIG. 6-B again, the valve cock 5 is pushed into the cavity 21' by means of the valve cotter 3'. When the hand is released from the valve cotter 3', the upper collar 51 of the valve cock 5 allows the inner water to flow out of the cavity 21' and prohibits the outer water from getting into the cavity 21'. Because the feed water quantity through the small hole 42 is smaller than the discharge water quantity through the grooves 34' of the block 33' of the valve cotter 3', the bottom water pressure is reduced. Therefore, the water pressure below the cavity 21'< the water pressure in the cavity 21'< the water pressure above the cavity 21'. Consequently, water current runs through the small hole 23' into the cavity 21' to force the valve cotter 3' to drop slowly and to let the upper collar 51 break away from the cavity 21', so as to further let the bottom collar 52 be forced by the water pressure of the water current to block up the water passage 43 and to stop water supply.

In general, as above-described, the present invention is to provide such a faucet having numerous features as hereunder.

<1> With water current, the valve cotter is forced by water pressure to let its bottom collar block up water outlet so as to stop water supply. The component parts include only a casing, a valve cotter, a valve cock, and a sealing plug. The friction area is limited to the edge of the valve cock to minimize friction loss. Therefore, the present invention provides almost "zero" defect.

<2> The draw-off tap and the water temperature and flow rate adjusting means are independently arranged. Water supply is separately controlled after adjusting of water temperature and flow rate to prevent from waste of water and to simplify the operation. Any break-down of the faucet, the water can be simply stopped by means of the flow rate adjusting means, and the whole component parts can be taken out altogether for quick repair by removing the sealing plug from the housing.

<3> The operating point is at the water outlet. When valve cotter is pushed upward, water comes out immediately for service. No waste of water is to be worried about. After wash, the draw-off tap shuts off automatically. During washing, the valve cotter is also washed by the discharging water. Indeed, the present invention provides the most clean, time and water saving faucet specifically for hand wash.

<4> The housing and the built-up component parts are separately manufactured for quick assembly. The housing may be made of excellent and durable material, while the other component parts may be made of cost-effective material applicable for replacement in reduced cost. Therefore, the present invention is to provide a high-class and more practical faucet.

As indicative, the structure herein may be variously embodied. Recognizing various modifications will be apparent, the scope hereof shall be deemed to be defined by the claims as set forth below.

I claims:

1. In combination, a water faucet housing (1) having an undersurface equipped with an open (at 11);
   an upstanding casing structure (2,4) seated in said opening, so that said casing structure is oriented vertically within the faucet housing;
   said casing structure comprising an annular upstanding side wall, a roof wall extending across said side wall to form a cavity (21), a water flow hole means (42) extending through said side wall faucet housing into the casing structure, and an annular valve seat (at 43) located below the plane of said flow hole means whereby water is enabled to flow downwardly from the casing structure through the valve seat;
   a vertical stem (3) oriented on the axis of said casing structure, said vertical stem including an upper section located within the casing structure and a lower section located below the casing structure, the lower exposed section of the stem being adopted to be manually pushed or pulled to adjust the position of the stem relative to the casing structure;
   an annular valve cock (5) carried on the upper section of said stem within the casing structure;
   said valve cock comprising a lower collar (52) located below the general plane of the water flow hole means (42) for movement toward or away from the valve seat, and an upper collar (51) located above the general plane of the water flow hole means, said upper collar having a peripheral edge seatable against the inner surface of the casing structure above the flow hole means, the inner surface of the casing structure side wall being spaced radially away from the outer edge of said upper collar in the vicinity of the flow hole means, so that when the upper collar approaches the plane of the flow hole means fluid can flow into or out of the cavity located above said upper collar;

said stem having a raised position wherein water flowing through the flow hole means exerts a buoyant effect on the lower face of the upper collar such that the lower collar is spaced above the valve seat;

said stem having a lowered position wherein water pressure exerts a downward force on the valve cock sufficient to hold the lower collar against the valve seat.

2. The combination of claim 1, wherein the cross sectional area of said flow hole means (42) is less than the cross sectional area of the flow path defined between said stem (3) and the surrounding annular valve seat, whereby the flow hole means determines the flow hole means determines the flow rate through the faucet.

3. The combination of claim 2, wherein said flow hole means is sized so that water is discharged from the faucet as a low velocity stream, as distinguished from a high velocity spray.

4. The combination of claim 1, wherein said stem comprises a cylindrical block (33) extending within a central opening defined by said valve seat (43) said block having a plurality of flow grooves (34) spaced around its surface, whereby the water flow out of the faucet is subdivided into a number of component streams.

5. The combination of claim 1, wherein manual movement of said stem from its lowered position to its raised position enables air to be squeezed out of the cavity through a gap created between the casing structure side wall and the peripheral edge of said upper collar (51), said upper collar being adapted to then maintain fluid in the superjacent cavity so that the stem is maintained in its raised condition.

6. The combination of claim 1, wherein said stem is adapted to continually maintain its raised or lowered position in the absence of manual adjustment forces thereon.

7. The combination of claim 1, and further comprising a relatively small hole (23') extending through the roof wall of said casing structure, whereby when the stem is in its raised position water can slowly flow through said hole into the cavity above the upper collar so that the stem and valve cock are slowly forced to move downwardly to the lowered position.

8. The combination of claim 7, and further comprising a coil spring (7) located in the cavity to exert a downward force on the stem.

* * * * *